United States Patent [19]

Bhattacharyya

[11] Patent Number: 4,830,840

[45] Date of Patent: May 16, 1989

[54] PROCESS FOR REMOVING SULFUR OXIDE AND NITROGEN OXIDE

[75] Inventor: Alakananda Bhattacharyya, Columbia, Md.

[73] Assignee: UOP

[21] Appl. No.: 25,355

[22] Filed: Mar. 13, 1987

[51] Int. Cl.$^4$ ............................ B01J 8/00; C01B 17/00
[52] U.S. Cl. ..................................... 423/239; 423/244; 208/113; 208/120
[58] Field of Search .......... 423/242 A, 242 R, 244 A, 423/244 R, 239 A, 239; 208/113, 120

[56] References Cited

U.S. PATENT DOCUMENTS

| | | | |
|---|---|---|---|
| 3,597,365 | 8/1971 | Ward | 252/301.4 |
| 3,702,882 | 11/1972 | Rettew et al. | 423/600 |
| 4,256,722 | 3/1981 | Carrier | 423/594 |
| 4,400,431 | 8/1983 | Henslee et al. | 428/402 |
| 4,469,589 | 9/1984 | Yoo et al. | 208/120 |
| 4,472,267 | 9/1984 | Yoo et al. | 208/120 |
| 4,642,178 | 2/1987 | Yoo et al. | 423/244 |
| 4,735,705 | 4/1988 | Burk et al. | 423/244 |

FOREIGN PATENT DOCUMENTS 389822 11/1973 U.S.S.R. .............. 423/244

Primary Examiner—Gregory A. Heller
Attorney, Agent, or Firm—Vincent J. Vasta, Jr.

[57] ABSTRACT

A process for the production of an alkaline earth metal, aluminum-containing spinel/clay composition comprises: (a) combining (1) an acidic, aluminum-containing composition in which the aluminum is present in a positively charged species, and (2) a basic, alkaline earth metal-containing composition to form a gel mixture; (b) mixing the gel with kaolin clay to form a co-gel; and (c) calcining the co-gel mixture to form the alkaline earth metal, aluminum-containing spinel composition in a clay matrix. Alkaline earth metal, aluminum-containing spinel/clays having both high surface areas and very high attrition resistance, and processes for using spinel/clay compositions, e.g., as sulfur oxide and nitrogen oxide removal agent, are also disclosed.

14 Claims, No Drawings

PROCESS FOR REMOVING SULFUR OXIDE AND NITROGEN OXIDE

This invention relates to improved alkaline earth metal, aluminum spinel/kaolin clay compositions, and processes for producing and using such spinel/kaolin clays. The present invention involves such spinel/kaolin clays which have both high surface area and much improved attrition resistance, an improved process for producing such spinel/kaolin clay compositions, and improved processes for using spinel/kaolin clay compositions to reduce sulfur oxide and/or nitrogen oxide atmospheric emissions.

U.S. Pat. Nos. 4,469,589 and 4,472,267 relate to improved materials for reducing $SO_x$ atmospheric emissions, e.g., from hydrocarbon catalytic cracking units, which materials comprise spinels, preferably alkaline earth metal, aluminum-containing spinels, and may contain one or more metal components capable of promoting the oxidation of sulfur dioxide to sulfur trioxide at combustion conditions. U.S Pat. Nos. 4,471,070; 4,472,532; 4,476,245; 4,492,677; 4,492,678; 4,495,304; 4,495,305; and 4,522,937 also relate to spinel compositions useful to reduce sulfur oxide atmospheric emissions and/or relate to processes for producing such spinel compositions. Commonly assigned U.S. patent applications Ser. Nos. 849,025, 848,954, and 848,955 relate to spinel compositions which also contain at least one reductive metal component effective to reduce metal sulfate at metal sulfate reducing conditions. The specification of each of these patents and patent applications is hereby incorporated by reference herein.

Various methods or processes have been suggested for the production of spinels. For example, see the above-noted patents, patent applications and certain of the patents and other literature discussed therein. Additional spinel preparation procedures are set forth in U.S. Pat. Nos. 3,597,365; 3,702,882; 4,256,722; and 4,400,431.

In spite of the improvements in this area to date, there remains a need for still further improved spinels and spinel compositions having greater resistance to attrition in fluid catalytic cracking applications, and for improved processes for making and using such spinels and spinel compositions.

A process for the production of an alkaline earth metal, aluminum-containing spinel/clay compositions has been discovered. In one embodiment, the process comprises: (a) combining (1) an acidic, aluminum-containing composition in which the aluminum is present in a positively charged species; and (2 a basic, alkaline earth metal-containing composition to form a mixture, preferably a gel, (b) mixing the gel with kaolin/clay to form a co-gel; (c) calcining the co-gel mixture to form an alkaline earth metal, aluminum-containing spinel composition in a kaolin clay matrix.

In a further embodiment the process comprises (a) combining (1) an acidic, aluminum-containing composition in which the aluminum is present in a positively charged species; (2) a basic, alkaline earth metal-containing composition, and (3) kaolin clay to form a mixture, preferable a co-gel; (b) optionally mixing the co-gel with additional kaolin clay and, (c) calcining the co-gel mixture, preferably after drying.

Preferably, the present spinel/kaolin clays are produced in accordance with the above-noted processes. In a further embodiment, the present invention involves an improved process for reducing a least one of (1) the sulfur oxide content of a sulfur oxide-containing gas and (2) the nitrogen oxide content of a nitrogen oxide-containing gas which includes contacting the gas with a material at conditions effective to reduce at least one of (1) the sulfur oxide content and (2) the nitrogen oxide content of the gas. The present improvement comprises utilizing as at least part of the material a spinel/kaolin clay composition prepared in accordance with the above-noted process and/or the above-noted spinel/kaolin clay.

The present process for preparing spinel/kaolin clays and spinel/kaolin compositions provides substantial advantages. For example, the spinel/kaolin clays produced by this process can have both desirably high surface areas and much improved attrition resistances. In addition, the present process is relatively easy to practice and control, can be practiced in conventional equipment, e.g., used to prepare hydrocarbon cracking catalysts, and can employ feed materials which result in reduced pollution, e.g., sulfur oxide and/or nitrogen oxide atmospheric emissions, from the preparation process.

Furthermore, the addition of substantial amounts of kaolin clay to the spinels improves the overall cost effectiveness of the resulting products without sacrificing desireable levels of activity and simultaneously improves the hardness of the resultant spinel/kaolin clay compositions.

The presently prepared spinel/kaolin clays and spinel/kaolin clay compositions may be used, for example, in the form of particles of any suitable shape and size. Such particles may be formed by conventional techniques, such as spray drying, pilling, tableting, extrusion, bead formation (e.g., conventional oil drop method) and like. When spinel/kaolin clay-containing particles are to be used in a fluid catalytic cracking unit, it is preferred that a major amount by weight of the spinel/kaolin clay-containing particles have diameters in the range of about 10 microns to about 250 microns, more preferably about 20 microns to about 125 microns.

This invention further relates to the production of alkaline earth metal and aluminum-containing spinel/kaolin clays and spinel/kaolin clay compositions which include at least one additional metal component in an amount effective to promote the oxidation of $SO_2$ to $SO_3$ at $SO_2$ oxidation conditions and/or at least one reductive metal component in an amount effective to promote the reduction of alkaline earth metal sulfate at alkaline earth metal sulfate reducing conditions. The additional metal component and the reductive metal component may be included with the alkaline earth metal, aluminum-containing spinels and spinel compositions using techniques, such as impregnation and the like, which are conventional and well known in the art. Preferably, the additional metal component and the reductive metal component are included with the present spinel/kaolin clay and spinel/kaolin clay compositions in a process to be discussed in detail hereinafter.

The spinel structure is based on a cubic close-packed array of oxide ions. Typically, the crystallo-graphic unit cell of the spinel structure contains 32 oxygen atoms. With regard to magnesium aluminate spinel, there often are eight Mg atoms and sixteen Al atoms to place in a unit cell (8MgA1204).

The present alkaline earth metal, aluminum-containing spinel/kaolin clays and spinel/kaolin clay compositions include a first metal (alkaline earth metal) and a second metal (aluminum) having a valence higher than the valence of the first metal. The atomic ratio of the first metal to the second metal in any given alkaline earth metal, aluminum-containing spinel/kaolin clays of the present invention need not be consistent with the classical stoichiometric formula for such spinels. In one embodiment, the atomic ratio of the alkaline earth metal to aluminum in the spinel/kaolin clays of the present invention is preferably at least about 0.17 and more preferably at least about 0.25. It is preferred that the atomic ratio of alkaline earth metal to aluminum in the spinels be in the range of about 0.17 to about 2.5, more preferably about 0.25 to about 2.0, and still more preferably about 0.5 to about 1.5.

The preferred alkaline earth metal is magnesium.

The presently useful acidic composition contains aluminum which is present in a positively charged species. This acidic composition is preferably aqueous-based and preferably has a pH in the range of about 1.5 to about 5. Any suitable aluminum component or components may be included in the presently useful acidic compositions, provided that the aluminum is present in a positively charged species and is useful in the present process to produce a spinel composition. For example, the aluminum may be present in the acidic composition as an acid salt, e.g., nitrate, sulfate, formate or the like or as at least partially peptized or dispersed alumina. The aluminum is preferably present in the acidic composition as at least partially peptized or dispersed alumina. More preferably at least a major amount by weight of the aluminum, still more preferably substantially all of the aluminum, is present in the acidic composition as peptized or dispersed alumina.

Peptizable alumina useful in the present invention include those which are at least partially peptized or dispersed in the presence of an aqueous solution of at least one mono-basic acid having an anion no larger than that of propanoic acid. Included among such mono-basic acids are formic acid, acetic acid, propanoic acid, $HNO_3$, HCl, citric acid, mono-, di-, and trichloracetic acids and mixtures thereof. By "peptizing" or "dispersing" is meant providing a substantially homogeneous, nonagglomarate-containing solution or sol.

The acidic composition is preferably prepared by combining peptizable (dispersible) alumina, e.g., pseudo boehmite and the like and/or precursors of such alumina, with water and one or more suitable peptization agents, e.g., one or more of the above-noted acids, to form peptized alumina. The peptization agent or agents is preferably chosen so that the agent or agents have no substantial deleterious effect on the process or the resulting products. By "precursors of such alumina" is meant those aluminum components which form, or function in substantially the same manner, as peptizable (dispersible) alumina in the presently useful acidic aluminum-containing composition. Preferred peptization agents include formic acid, mono-protic mineral acids, e.g., HCl, $HNO_3$ and mixtures thereof. Because of environmental, performance and other considerations, formic acid is more preferred for use in the present aluminum-containing, acidic compositions.

The presently useful basic alkaline earth metal-containing composition is selected so that a mixture, preferably a gel, is formed when this basic composition is combined with the acidic aluminum-containing composition. In one embodiment the basic composition is aqueous based, e.g., with the alkaline earth metal component being soluble or insoluble in the aqueous medium. Any suitable alkaline earth metal component or components may be used in the preparation of the basic composition or may be present in the basic composition. Examples of suitable alkaline earth metal components for use in preparing the basic composition include oxides, precursors of oxides, nitrates, sulfates, formates, acetates, acetyl acetonates, phosphates, halides, carbonates, sulfonates, oxalates, and the like and mixtures thereof. The preferred alkaline earth metal components are selected from the group consisting of oxides, precursors of oxides and mixtures thereof. The basic composition may be prepared by combining alkaline earth metal oxide and/or precursors of such oxide with water. By "precursors of such oxides" is meant those alkaline earth metal components which form, or function in substantially the same manner as, alkaline earth metal oxide in the presently useful basic alkaline earth metal-containing compositions. The alkaline earth metal hydroxides are included among such precursors. If magnesium oxide is used in the basic composition, it is preferred that this material have a surface area (in square meters per gram; $m^2/g$) greater than about 25 $m^2/gm.$, more preferably greater than about 50 $m^2/gm.$ (as determined by the standard B.E.T. method). The use of such high surface area or high reactivity magnesia has been found to provide improved results, e.g., increased spinel formation.

The amount of aluminum component in the acidic composition and of alkaline earth metal component in the basic composition, respectively, may vary widely depending, for example, on the specific aluminum and alkaline earth metal components used and on the type of processing equipment being employed. If the compositions are aqueous based, it is preferred that the acidic composition include about 1% to about 50% by weight of aluminum, calculated as alumina, and that the basic composition include about 1% to about 50% by weight of alkaline earth metal, calculated as the oxide. The relative proportions of acidic and basic compositions employed depends on the desired chemical make up, e.g., alkaline earth metal to aluminum atomic ratio, of the product spinel composition.

The kaolin clay used to form the co-gel in the process of the present invention is an RC-32 clay used as received from the manufacturer Thiele Kaolin Co. An alternative Kaolin clay which would also be useful in the present invention is B-80, another Kaolin clay manufactured by Thiele Kaolin Co. The clay can be added in any amount to the other co-gel ingredients. Preferably an amount of clay sufficient to form a dried spinel/clay product having up to about 90% by weight of clay will be used. More preferably an amount of clay sufficient to form a dried spinel/clay product having from 10% to about 75% by weight will be utilized. Still more preferably, an amount to form a dried spinel/clay product having from 10% to 40% by weight will be employed.

The proportions of the acidic and basic compositions may be chosen to provide a spinel/kaolin clay composition containing free alkaline earth metal oxide. In one embodiment, the present spinel/kaolin clay compositions preferably contain free magnesia, more preferably about 0.1% to about 30% by weight of free magnesia. The inclusion of such free magnesia has been found in certain instances to provide for improved sulfur oxide and/or nitrogen oxide removal effectiveness.

The mixture, preferably a gel or a co-gel, formed in step (a) of the present process is preferably basic. If, as is preferred, the mixture is aqueous based; it is preferred that the pH of the mixture be greater than 7, more preferably in the range of greater than 7 to about 10.5, and still more preferably in the range of about 8 to about 9.5. The basicity of the mixture can be adjusted after the mixture is formed by the addition of an acid or base, as required. Preferably, the acidity of the acidic, aluminum-containing composition and the basicity of the basic alkaline earth metal-containing composition are properly selected so that the mixture has the desired degree of basicity, e.g., the desired pH.

Step (a) of the present process is carried out at conditions, e.g., of temperature, pressure and time, effective to form an alkaline earth metal, aluminum-containing mixture, preferably a gel. These conditions may vary widely, depending, for example, on the equipment being used, the particular feed components being employed and the degree of gelation desired. In most instances, ambient temperature and pressure provide acceptable results. The time provided to form a gel or a co-gel may be in the range of about 0.1 hours to about 24 hours or more. The various compositions to be combined in step (a) may be combined in any suitable sequence, e.g., which is convenient. For example, the acidic compositions may be added to the basic compositions, and the kaolin clay, or vise versa. These compositions may be added to a single vessel together. Also, other compositions e.g., containing the additional and reductive metals, may be added separately, or together with the acidic and/or basic compositions. Agitation may be provided during step (a). Also, water or another liquid medium may be added so that the gel can be more easily moved or transported to the next processing step.

The mixture, which is preferably dried, is calcined to yield the alkaline earth metal, aluminum-containing spinel/kaolin clay composition. Drying and calcination may take place simultaneously. However, it is preferred that the drying take place at a temperature below that at which water of hydration is removed from the spinel precursor, i.e., the mixture or gel. Thus, this drying may occur in flowing air at temperatures below about 500 degrees F., preferably about 230 degrees F. to about 450 degrees F., more preferably about 250 degrees F. to about 450 degrees F.

The drying of the mixture can be accomplished in various manners, for example, by spray drying, drum drying, flash drying, tunnel drying and the like. The drying temperature or temperatures is selected to remove at least a portion of the liquid phase. Drying times are not critical to the present invention and may be selected over a relatively wide range sufficient to provide the desired dried product. Drying times in the range of about 0.2 hours to about 24 hours or more may be advantageously employed.

Spray drying equipment which is conventionally used to produce catalyst particles suitable for use in fluidized bed reactors may be utilized in the practice of the present invention.

Suitable calcination temperatures for the mixture or dried mixture are in the range of about 1000 degrees F. to about 1800 degrees F. However, it has been found that improved spinel/clay formation occurs when the calcination temperature is maintained within the range of about 1050 degrees F. to about 1600 degrees F. and still more preferably about 1150 degrees F. to about 1400 degrees F. Calcination of the co-gel may take place in a period of time in the range of about 0.5 hours to about 24 hours or more, preferably in a period of time in the range of about 1 hour to about 10 hours. The calcination of the mixture may occur at any suitable conditions, e.g., inert, reducing or oxidizing conditions, although oxidizing conditions are preferred.

In one embodiment of the process of this invention, at least one of the additional metal components and/or reductive metal components, noted previously, is associated with the spinel composition by impregnating the mixture, preferably the co-gel, formed in step (a) with the desired additional/reductive metal compounds. The impregnated mixture, preferably co-gel, is preferably dried and, calcined, e.g., at the conditions noted above.

As noted above, in certain embodiments of this invention, the alkaline earth metal and aluminum-containing spinel/kaolin clays and spinel/kaolin clay compositions also contain at least one additional metal component. These additional metal components are defined as being capable of promoting the oxidation of sulfur dioxide to sulfur trioxide at sulfur dioxide oxidation conditions, e.g., the condition present in a hydrocarbon catalytic cracking unit catalyst regenerator. Increased carbon monoxide oxidation may also be obtained by including the additional metal components. Such additional metal components are preferably selected from the group consisting of Group IB, IIB, IVB, VIA, VIB, VIIA and VIII of the Periodic Table, the rare earth metals, niobium, tantalum, vanadium, tin, antimony, and mixtures thereof, and may be incorporated into the presently useful spinel compositions by one or more embodiments of the process invention. The more preferred additional metal component for use is selected from the group consisting of rare earth metals and mixtures thereof. A particularly preferred additional metal component is cerium.

The amount of the additional metal component or components present in the final spinel/clay and spinel/clay composition is often small compared to the quantity of the spinel/clay present. Preferably, the final spinel/clay and spinel/clay composition comprise a minor amount by weight of at least one additional metal component, more preferably up to about 25% by weight (calculated as elemental metal). Of course, the amount of additional metal used will depend, for example, on the degree of sulfur dioxide oxidation desired and the effectiveness of the additional metal component to promote such oxidation. When, as is more preferred, the additional metal component is rare earth metal component, the preferred amount of this additional metal component is within the range of about 1% to about 20%, more preferably about 2% to about 15% by weight (calculated as the elemental rare earth metal) of the total spinel or spinel composition, excluding the weight of clay present.

The additional metal component may exist with the spinel/clay or spinel/clay composition at least in part as a compound such as a oxide, sulfide, halide and the like, or in the elemental state. Preferably, at least a part of the additional metal component exists as the oxide.

The additional metal component or components may be associated with the present spinel/clays and spinel/clay compositions in any suitable manner, such as by impregnation of the spinel/clay composition at any stage in its preparation. Various procedures for incorporating these components into the present spinel/clay compositions are conventional and well known in the art. Preferably, however, such additional metal component or components are included using an embodiment of the present preparation process. Thus, at least one of the presently useful acidic and basic compositions, or a separate additional composition which is combined with the first and second compositions in step (a), includes at least one additional metal compound in an amount sufficient so that the spinel/clay composition includes an effective amount of at least one additional metal component. Preferably, the additional metal compound is present with the basic, alkaline earth metal-containing composition. More preferably, the additional metal compound is a salt, still more preferably cerous nitrate, which is present in solution.

Preferably, the present spinel/clays and spinel/clay compositions include at least one reductive metal component in an amount effective to promote the reduction of alkaline earth metal sulfate at alkaline earth metal sulfate reduction conditions, e.g., conditions existing in the reaction zone of a hydrocarbon catalytic cracking unit. More preferably, the reductive metal component or components and the additional metal component or components are present in amounts effective to promote the reduction of alkaline earth metal sulfate at alkaline earth metal sulfate reduction conditions, e.g., conditions existing in the catalyst reaction zone of a hydrocarbon catalytic cracking unit. The reductive metal component is preferably a component of a metal selected from the group consisting of iron, nickel, titanium, chromium, manganese, cobalt, germanium, tin, bismuth, molybdenum, antimony, vanadium and mixtures thereof. In the event, as is preferred, both additional and reductive metal components are present, it is preferred that the reductive metal component or components be of a metal or metals other than the additional metal or metals. More preferably, the reductive metal is selected from the group consisting of iron, nickel, cobalt, manganese, tin, vanadium and mixtures thereof. Particularly good results are obtained when the reductive metal component is a vanadium component.

The specific amounts of the reductive metal components included in the present spinel/clay compositions may vary widely, provided that these components are effective as described herein. Preferably, the reductive metal component is present in an amount between about 0.001% to about 10% by weight, calculated as elemental metal, of the present spinel compositions, excluding the amount of clay present. It is preferred that excessive amounts of reductive metal components be avoided, particularly in hydrocarbon conversion applications, to reduce the risk of substantially detrimentally affecting the primary process. If a vanadium component is included as the reductive metal component, it is preferably present in an amount of about 0.05% to about 7%, more preferably about 0.1% to about 5%, and still more preferably about 0.2% to about 2% by weight of vanadium, calculated as elemental metal.

The reductive metal component or components may be associated with the present spinel/clays and spinel/clay compositions in any suitable manner, such as by impregnation of the spinel composition at any stage in its preparation. Various procedures for incorporating these components into the present spinel/clay compositions are conventional and well known in the art. Preferably, however, such reductive metal component or components are included using an embodiment of the present preparation process. Thus, at least one of the presently useful acidic and basic compositions, or a separate additional composition which is combined with the acidic and basic composition in step (a), includes at least one reductive metal compound in an amount sufficient so that the spinel/clay composition includes an effective amount of at least one reductive metal component.

If the reductive metal component is one or more vanadium components, it is preferred that the vanadium compound used in the above-noted process be a water-soluble vanadium compound, i.e., a vanadium-containing entity (e.g., compound, complex and the like) which is soluble in water so that at least about 1% by weight of vanadium, calculated as elemental metal, is dissolved in the water. More preferably, the vanadium compound used is water soluble throughout a temperature range of 18 degrees C. to 22 degrees C. and a pH range of 2 to 11.

In order to obtain the preferred water solubility, the vanadium compound preferably is in the form of a vanadium complex of at least one complexing agent. A wide variety of complexing agents may be employed. The primary criterion for choosing a complexing agent or agents is that the agent or agents chosen provide a "water-soluble" vanadium compound. Of course, the complexing agent or agents should have no substantial detrimental effect on the present process or on the product spinel/clay compositions.

The preferred complexing agent for use in the present invention is selected from the group consisting of dicarboxylic acids containing 2 to about 12 carbon atoms per molecule, e.g., oxalic acid, malonic acid, succinic acid, glutaric acid, maleic acid, phthalic acids, tartaric acid; hydrazine; hydrazine derivatives; acetyl acetonate; acetyl acetonate derivatives; ethylene diamine tetra acetic acid and mixtures thereof. It is preferred that the vanadium in the water soluble vanadium compound useful in the present process be in the plus four oxidation state. If the vanadium is to be reduced to the plus four oxidation state, it is preferred to combine the vanadium, in a greater than plus four oxidation state, with one or more complexing agents present in an amount effective to reduce the vanadium to the plus four oxidation state. If such vanadium reduction is desired, the complexing agent is preferably selected from the group consisting of dicarboxylic acids containing 2 to about 12, more preferably 2 to about 8, carbon atoms per molecule. The still more preferred complexing agent for use in the present invention is selected from the group consisting of oxalic acid, malonic acid, succinic acid, glutaric acid, maleic acid, phthalic acids, tartaric acid and mixtures thereof. The recitation of specific complexing agents includes those compounds, precursors and derivatives of such compounds which form the recited complexing agents and/or function in substantially the same manner as the recited complexing agent to yield the preferred water-soluble vanadium compound.

Excellent results are obtained when the vanadium complexing agent for use in the present invention is oxalic acid.

The specific amount of complexing agent to be used in the present process is not critical, provided that the amount is sufficient to function as described herein. The amount will vary depending, for example, on the particular complexing agent or agents being used, the chemistry of the water-soluble vanadium compound to be formed, and the oxidation state of the vanadium in the material fed in the process. In one embodiment, the number of molecular weights of complexing agent employed is preferably in the range of about 0.5 to about 10, more preferably about 1 to about 6, for each atomic weight of vanadium.

The products prepared by the process of this invention possess unique structural properties, e.g., surface area and attrition resistance properties, and exhibit superior properties as sulfur oxide and/or nitrogen oxide removal materials, e.g., in fluid catalytic cracking operations, when compared with products prepared by conventional methods.

The present preparation process preferably produces an alkaline earth metal, aluminum-containing spinel/kaolin clay wherein the spinel exists in a clay matrix and has a surface area greater than about 40 $m^2$/gm., more preferably greater than about 50 $m^2$/gm. and still more preferably about 60 $m^2$/gm., and having an attrition resistance index (ARI) less than about 3.0, more preferably less than about 1.5 and still more preferably less than about 1.0.

The ARI of a cracking catalyst has been found to provide a reasonable correlation to catalyst attrition resulting from commercial, fluid catalytic cracking operations. The higher the ARI, the higher the expected catalytic attrition losses.

The ARI is determined as follows. A powered material (having a particle size greater than 20 microns) to be tested is subjected to an attrition causing step. This attrition causing step involves placing a predetermined amount of the powder in a hollow elongated tube and subjecting the powder to three (3) high velocity air jets. The fines (particles less than 20 microns) generated are separated via a Stokes separation section and collected in a thimble. The weight loss per unit line is measured hourly for five (5) hours. From these data, the total weight percent loss over the five (5) hour period is determined, as is the rate (slope) of weight percent loss between the one and five hour time periods.

The ARI of a material is defined as the relative slope of this weight percent loss versus time plot between one hour and five hours compared to a similar plot for Delta Series 400 cracking catalyst, a commercially available fluid hydrocarbon cracking catalyst sold by Katalistiks International, Inc. The absolute slope of the weight percent loss versus time plot will vary somewhat depending on the specific attrition causing test apparatus and conditions used. Katalistiks Intenational, Inc. indicates in its sales literature that the absolute value of the slope of the weight percent loss versus time (one to five hours) for Delta Series 400 cracking catalyst is typically 0.9.

One embodiment of the present invention involves contacting sulfur oxide and/or nitrogen oxide-containing gasses, e.g. combustion products, with a material comprising the present spinel/clays and spinel/clay compositions. Reduced concentrations of sulfur oxide and/or nitrogen oxide, e.g., reduced emissions of sulfur oxide and/or nitrogen oxide from the combustion zones, are achieved as a result of this contacting.

Typical combustion zones include, for example, fluid bed coal burning steam boilers and fluid san bed waste combustors. In the coal fired boiler application, the present spinel/clays and spinel/clay compositions may be added, either separately or with the sulfur-containing coal, to the combustion zone, e.g., boiler, where combustion takes place. The present compositions then leave the combustion zone with the coal ash and can be separated from the ash, e.g., by screening, density separation, or other well known solids separation techniques. In one embodiment, the sulfur oxide-containing gases are contacted with the present compositions at conditions to reduce the sulfur oxide content of the gases in one or more zones separate from the combustion zone.

Conditions within such contacting zones may be those typically used in contact zones employing conventional sulfur oxide or nitrogen oxide removal agents. The amount of the present spinel/clays and spinel/clay compositions used to contact a sulfur oxide-containing and/or nitrogen oxide-containing gas is sufficient to reduce the sulfur oxide and/or nitrogen oxide content of the gas, preferably, by at least about 50% and more preferably by at least 80%. Reducing conditions are such that at least a portion, preferably at least about 50% and more preferably at least about 80% of the sulfur associated with the composition is removed. For example, reducing conditions may include temperatures in the range of about 900 degrees F. to about 1000 degrees F.; pressures in the range of about 0 to about 100 psig; and reducing media, e.g., hydrogen, hydrocarbon and the like reducing media, to associated sulfur mole ratio in the range of about 1 to 10.

In yet another embodiment, the present invention relates to an improved hydrocarbon conversion, preferably cracking, process for converting a sulfur-containing hydrocarbon feedstock. The process comprises (1) contacting the feedstock with solid particles capable of promoting the conversion of the feedstock at hydrocarbon conversion conditions in at least one reaction zone to produce at least one hydrocarbon product and to cause deactivating sulfur-containing carbonaceous material to be formed on the solid particles; (2) contacting the deposit-containing particles with an oxygen-containing vaporous medium at conditions to combust at least a portion of the carbonaceous deposit material in at least one regeneration zone to thereby regenerate at least a portion of the hydrocarbon conversion catalytic activity of the solid particles and to form a regeneration zone flue gas containing sulfur oxide (e.g., sulfur trioxide) and/or nitrogen oxide; and (3) repeating steps (1) and (2) periodically. The present improvement comprises using, in intimate admixture with the solid particles, a minor amount of discrete entities having a chemical make-up which is different from the solid particles and which comprises the present spinel/clays. Such discrete entities are present in an amount sufficient to reduce the amount of sulfur oxides and/or nitrogen oxides in the flue gas.

The preferred relative amounts of the solid particles and discrete entities are about 80 to about 99 parts and about 1 to about 20 parts by weight, respectively.

This invention can be used to advantage with the catalyst (solid particles and discrete entities) being disposed in any conventional reactor-regenerator system, in ebullating catalyst bed systems, in systems which involve continuously conveying or circulating catalyst between reaction zone and regeneration zone and the like. Circulating catalyst systems are preferred. Typical of the circulating catalyst bed systems are the conventional moving bed and fluidized bed reactor-regenerator systems. Both of these circulating bed systems are conventionally used in hydrocarbon conversion, e.g., hydrocarbon cracking, operations with the fluidized catalyst bed reactor-regenerator systems being preferred.

Although the presently useful solid particles and discrete entities may be used as a physical admixture of separate particles, in one embodiment, the discrete entities are combined as part of the solid particles. That is, the discrete entities, e.g., comprising calcined microspheres of the ROS, are combined with the solid particles, e.g., during the manufacture of the solid particles, to form combined particles which function as both the presently useful solid particles and discrete entities. In this embodiment the discrete entities are preferably a separate and distinct phase in the combined particles. One preferred method for providing the combined particles is to calcine the discrete entities prior to incorporating the discrete entities into the combined particles.

The form, i.e., particle size, of the present particles, e.g., both solid particles and discrete entities as well as the combined particles, is not critical to the present invention and may vary depending, for example, on the type of reaction-regeneration system employed. Such particles may be formed into any desired shape such as pills, cakes, extrudates, powders, granules, spheres and the like, using conventional methods. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized systems, it is preferred that the major amount by weight of the particles have a diameter in the range of about 10 microns to about 250 microns, more preferably about 20 microns to about 150 microns.

The solid particles are capable of promoting the desired hydrocarbon conversion. By "hydrocarbon conversion" is meant a chemical reaction or conversion in which one or more of the feed materials or reactants and/or one or more of the products or conversion products is substantially hydrocarbon in nature, e.g., comprises a major amount of weight of carbon and hydrogen. The solid particles are further characterized as having a composition (i.e., chemical make-up) which is different from the discrete entities. In one preferred embodiment, the solid particles (or the solid particles portion of the combined particles described above) are substantially free of the present spinel/clays.

The composition of the solid particles useful in the present invention is not critical, provided that such particles are capable of promoting the desired hydrocarbon conversion. Although this invention is useful in many hydrocarbon conversions, the present catalyst, i.e., mixture comprising solid particles and discrete entities, and hydrocarbon conversion process find particular applicability in systems for the catalytic cracking of hydrocarbons where oxidative regeneration of catalyst is employed. Such catalysts generally contain zeolitic cracking components such as Y zeolite, LZ-210, ZSM-5 and forms of the aforementioned. Such catalytic hydrocarbon cracking often involves converting, i.e., cracking, heavier or higher boiling components, to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, derived from petroleum, shale oil, tar san oil, coal and the like. Such feedstock may comprise a mixture of straight run, e.g., virgin, gas oil. Such gas oil fractions often boil primarily in the range of about 400 degrees F. to about 1000 degrees F. Other substantially hydrocarbon feedstocks, e.g., naphtha, high boiling or heavy fractions of petroleum, petroleum residuum, shale oil tar sand oil, coal and the like and mixtures thereof, may be cracked using the catalyst and method of the present invention. Such substantially hydrocarbon feedstock often contains minor amounts of other elements, e.g., sulfur, nitrogen, oxygen and the like. In one aspect, the present invention involves converting a hydrocarbon feedstock containing sulfur and/or sulfur chemically combined with the molecules of hydrocarbon feedstock. The present invention is particularly useful when the amount of sulfur in such hydrocarbon feedstock is in the range of about 0.01% to about 5%, preferably about 0.1% to about 3%, by weight of the total feedstock.

Hydrocarbon cracking conditions are well known and often include temperatures in the range of about 850 degrees F. to about 1100 degrees F., preferably about 900 degrees F. to about 1050 degrees F. Other reaction conditions usually include pressures of up to about 100 psig.; catalyst to oil ratios of about 1 to 2 to about 25 to 1, preferably about 3 to 1 to about 15 to 1 and weight hourly space velocities (WHSV) of about 3 to about 60. These hydrocarbon cracking conditions may be varied depending, for example, on the feedstock and solid particles or combined particles being used, the reactor-regenerator system, e.g., fluid or moving bed catalytic cracking system, being employed and the product or products wanted.

In addition, the catalytic hydrocarbon cracking system includes a regeneration zone for restoring the catalytic activity of the solid particles or combined particles of catalyst previously used to promote hydrocarbon cracking. Carbonaceous, in particular sulfur-containing carbonaceous, deposit-containing catalyst particles from the reaction zone are contacted with free oxygen-containing gas in the regeneration zone at conditions to restore or maintain the activity of the catalyst by removing, i.e., combusting, at least a portion of the carbonaceous material from the catalyst particles. When the carbonaceous deposit material contain sulfur, at least one sulfur-containing combustion product is produced in the regeneration zone and may leave the zone with the regenerator flue gas. The conditions at which such free oxygen-containing gas contacting takes place may vary, for example, over conventional ranges. The temperature in the catalyst regeneration zone of a hydrocarbon cracking system is often in the range of about 900 degrees F. to about 1500 degrees F., preferably about 1100 degrees F. to about 1350 degrees F. and more preferably about 1100 degrees F. to about 1300 degrees F. Other conditions within such regeneration zone may include, for example, pressures up to about 100 psig., and average catalyst contact times within the range of about 3 minutes to about 75 minutes. Sufficient oxygen is preferably present in the regeneration zone to completely combust the carbon and hydrogen of the carbonaceous deposit material, for example, to carbon dioxide and water. The amount of carbonaceous material deposited on the catalyst in the reaction zone is preferably in the range of about 0.005% to about 15%, more preferably about 0.1% to about 10%, by weight of the catalyst. That amount of sulfur, if any, contained in the carbonaceous deposit material depends, for example, on the amount of sulfur in the hydrocarbon feedstock. This deposit material may contain about 0.01% to about 10% or more by weight of sulfur. At least a portion of the regenerated catalyst is often returned to the hydrocarbon cracking reaction zone.

The following examples are provided to better illustrate the invention, without limitation, by presenting various specific embodiments of the processes and compositions of the present invention.

EXAMPLES 1 AND 2

These examples illustrate the complexation of vanadium materials with oxalic acid.

EXAMPLE 1

An aqueous solution containing vanadium was prepared by dissolving 2 molecular weights of oxalic acid dihydrate ($H_2C_2O_4.2H_2O$) and one molecular weight of $NH_4VO_3$ in the required amount of water at 40 degrees C. A green solution resulted including a water-soluble vanadium compound. This green solution turned blue when one more molecular weight of oxalic acid dihydrate was added, possibly due to the formation of a water-soluble vanadium compound with vanadium in the plus four oxidation state.

EXAMPLE 2

An aqueous solution containing vanadium was prepared by dissolving 5 molecular weights of oxalic acid dihydrate and 1 molecular weight of vanadium pentoxide in the required amount of water at 40 degrees to 50 degrees C. The final solution had a deep blue coloration which suggests the reduction of the vanadium in the plus five oxidation state to vanadium in the plus four oxidation state and the formation of a water soluble vanadium compound $H_2VO(C_2O_4)_2$.

EXAMPLE 3

This example illustrates the formation of a magnesia rich, magnesium, aluminum-containing spinel composition.

An aqueous, gel-containing slurry having a pH of 9.15 was formed by combining, at ambient temperatures, 68 kilograms (Kg.) of water, 2.76 Kg. of formic acid, 3.91 Kg. (solid basis) of pseudo bohemite alumina, and 3.1 Kg. of magnesia having a surface area of 96 $m^2/gm$. The slurry was spray dried, and the spray dried product was calcined in an air atmosphere at 1350 degrees F. for two hours. This material was magnesium, aluminum-containing spinel and free magnesia (17% of the total weight was free magnesia as determined by x-ray diffraction). The material had an average particle size of 56 microns, a surface area of 123 $m^2/gm$., an Attrition Resistance Index (ARI) of 1.08.

EXAMPLE 4

85.8 gm. of the calcined material from Example 3 was impregnated first with 42 gm. of a 60% by weight aqueous solution of $Ce(NO_3)_3.6H_2O$ which was diluted with water to 42 ml., and then impregnated with 25 ml. of an aqueous solution as described in Example 2 made from 6.17 gm. of oxalic acid dihydrate and 1.78 gm. of vanadium pentoxide. The resulting product was dried at 250 degrees F. overnight and then calcined in an air atmosphere at 1325 degrees F. for 1.5 hours. The resulting material contained 10% by weight of cerium (calculated as elemental cerium) and 1% by weight of vanadium (calculated as elemental vanadium), and 12.4% by weight of free magnesia (by x-ray diffraction). The physical properties and the "Sulfur Dioxide Oxidation and Absorption Index" (SOAI) of this material are shown in the Table 1 presented hereinafter.

EXAMPLE 5

42.2 gm. of an aqueous, 60% by weight cerium nitrate solution was diluted with water to 45 ml. To this was added 10 ml. of an aqueous solution as described in Example 2 containing 0.89 g. of vanadium pentoxide and 3.1 gm. of oxalic acid dihydrate. 85.8 grams of the calcined material from Example 3 was impregnated with the above-mixed solution. The resulting product was dried at 250 degrees F. overnight and calcined in an air atmosphere at 1325 degrees F. for 1.5 hours. The resulting material contained 10% by weight of cerium (calculated as elemental cerium), 0.5% by weight vanadium (calculated as elemental vanadium), and 12.1% by weight of free magnesia (by x-ray diffraction). The physical properties and the SOAI of this material are shown in the Table 1 presented hereinafter.

EXAMPLE 6

In a continuous run, an aqueous gel-containing slurry (8% by weight solids) was prepared containing 11.5 Kg. of formic acid, 20.6 Kg. (solid basis) pseudo-boehmite alumina, 16.4 Kg. (solid basis) of magnesia having a surface area of 96 $m^2/gm$. and 5.65 Kg. (solid basis) of milled cerium oxide. The slurry was spray dried and the dried product was calcined in an air atmosphere at 1350 degrees F. for two hours. A 200 gm. portion of the calcined material was impregnated with 95 ml. of aqueous solution containing 4.6 gm. of $NH_4VO_3$ and 9.9 grams of oxalic acid dihydrate. The impregnated product was dried at 250 degrees F. and the dried material was calcined in an air atmosphere at 1325 degrees F. for two hours. This magnesium, aluminum-containing spinel composition contained 10% by weight of cerium (calculated as elemental cerium), 1% by weight vanadium (calculated as elemental vanadium) and 13.3% by weight for free magnesia (by xray diffraction). Physical properties and the SOAI of this material are shown in the Table 1 presented hereinafter.

EXAMPLE 7

Example 6 was repeated, except that the magnesia used to prepare the slurry had a surface area of 36 $m^2/gm$. The magnesium, aluminum-containing spinel composition included less magnesium, aluminum-containing spinel than did the corresponding composition in Example 6. This demonstrates one of the primary advantages of using the more preferred high reactivity magnesia, i.e., magnesia having a surface area greater than about 50 $m^2/gm$.

EXAMPLE 8

An aqueous, gel-containing slurry was prepared by combining 19 Kg. of water, 700 gm. of formic acid, 979 gm. (dry basis) of pseudo bohemite alumina, 775. 2 gm. (dry basis) of magnesia having a surface area of 96 $m^2/gm$. and 844 gm. of a 60% by weight aqueous solution of $Ce(NO_3)_3.6H_2O$. This slurry was spray dried and the dried product was calcined in an air atmosphere at 1325 degrees F. for two hours. 98.2 gm. of this calcined product was impregnated with 83 ml. of an aqueous solution containing 1.78 gm. of vanadium pentoxide and 6.17 gm. of oxalic acid dihydrate. The impregnated product was dried at 250 degrees F. overnight, and the dried product was calcined at 1325 degrees F. for two hours. The resulting magnesium, aluminum-containing spinel composition contained cerium, vanadium and about 15.4% by weight of free magnesia (by x-ray diffraction). Physical properties and the SOAI of this material are shown in the Table 1 presented hereinafter.

EXAMPLE 9

An aqueous, gel-containing slurry was prepared by combining 19 kg. of water, 700 gm. of formic acid, 979 gm. (dry basis) of pseudo bohemite alumina, 775.2 gm. (dry basis) of magnesia having a surface area of 96 $m^2$/gm., and 436 ml. of an aqueous solution containing 36.6 gm. of vanadium pentoxide and 123 gm. of oxalic acid dihydrate. This slurry was spray dried and the dried product was calcined in an air atmosphere at 1325 degrees F. for two hours. 87.7 gm. of this calcined product was impregnated with 42.2 gm. of a 60% by weight aqueous solution of $Ce(NO_3)_3.6H_2O$ which was diluted with water to 71 ml. This impregnated product was dried at 250 degrees F. for three hours and then calcined at 1325 degrees F. in an air atmosphere for 1.5 hours. The resulting magnesium, aluminum-containing spinel composition contained cerium, vanadium and about 10.7% by weight of free magnesia (by x-ray diffraction). The physical properties and SOAI of this composition are shown in the Table 1 presented hereinafter.

EXAMPLE 10

An aqueous, gel-containing slurry was prepared by combining 19 kg. of water, 700 gm. of formic acid, 979 gm. (dry basis) of pseudo bohemite alumina, 775.2 gm. (dry basis) of magnesia having a surface area of 96 $m^2$/gm., 844 gm. of a 60% by weight aqueous solution of $Ce(NO_3)_3.6H_2O$, and 436 ml. of an aqueous solution containing 36.6 gm. of vanadium pentoxide and 123 gm. of oxalic acid dihydrate. This slurry was spray dried and the spray dried product was calcined in an air atmosphere at 1325 degrees F. for 2 hours. The resulting magnesium, aluminum-containing spinel composition contained cerium, vanadium and about 8.3% by weight of free magnesia (by x-ray diffraction). The physical properties and SOAI of this composition are shown in the Table 1 presented hereinafter.

EXAMPLE 11

An aqueous, gel-containing slurry was prepared by combining 56 kg. of water, 2.56 kg. of formic acid, 3.36 kg. (dry basis) of pseudo bohemite alumina, 14.1 KG. of an aqueous, milled slurry containing 0.95 kg. (dry basis) of $CeO_2$, 2.9 kg. (dry basis) of magnesia having a surface area of 96 $m^2$/gm., and 1100 ml. of an aqueous solution containing 124.6 grams of vanadium pentoxide and 370 grams of oxalic acid dihydrate. This slurry was spray dried and the dried product was calcined. The resulting magnesium, aluminum-containing spinel composition contained cerium, vanadium and about 15% by weight of free magnesia (by x-ray diffraction). The physical properties and SOAI of this composition are shown in the Table 1 presented hereinafter.

EXAMPLE 12

This example illustrates an alternate approach to making spinel compositions in which the aluminum feed material is present in an anion.

A solution (A) was prepared by dissolving 9 Kg. of $Mg(NO_3)_2.6H_2O$ in 16 Kg. of water and mixed with 48 Kg. of water. A second solution (B) was prepared by mixing 7.8 Kg. of an aqueous sodium aluminate solution (41% by weight sodium aluminate), 0.73 Kg. of an aqueous 50% by weight NaOH solution and 13.3 Kg. of water. Solution B was added slowly to solution A under high shear mixing, forming a gel. After addition was complete, 1.86 Kg. of an aqueous solution 60% by weight cerium nitrate was added to the gel and the resultant mixture agitated for 30 minutes. The gel was filtered and washed with 25 ml. of water per gm. of solid. The resulting filter cake was 11% by weight of solids. This material was slurried with enough water to give an overall solids content of 10% by weight and the slurry fed to a wheel atomizer spray dryer. After spray drying the microspheres were washed with 20 ml. of water per gm. of solid and the washed microspheres dried at 220 degrees F. and calcined in an air atmosphere at 1350 degrees F. for two hours. A 60 gm. portion of the calcined material was impregnated with 36 ml. of an aqueous solution containing 1.07 gm. of vanadium pentoxide and 3.17 gm. of oxalic acid dihydrate. The impregnated material was dried at 250 degrees F. overnight and calcined at 1325 degrees F. in an air atmosphere for two hours. The resulting magnesium, aluminum-coating spinel composition contained cerium, vanadium and no free magnesia (by x-ray diffraction). The physical properties and SOAI of this composition are shown in the Table 1 presented hereinafter.

TABLE 1

| Final Composition from Example | Surface Area $m^2$/gm. | Average Particle Size microns | Attrition Resistance Index (ARI) | SOAI* |
|---|---|---|---|---|
| 3 | 123 | 56 | 1.08 | — |
| 4 | 113 | 62 | 1.21 | 17.2 |
| 5 | 106 | 58 | 0.42 | 15.7 |
| 6 | 196 | 56 | 0.26 | 12.1 |
| 8 | 103 | 49 | 1.08 | 19.6 |
| 9 | 107 | 49 | 0.77 | 18.9 |
| 10 | 302 | 53 | 1.02 | 17.1 |
| 11 | 105 | 53 | 1.07 | 10.6 |
| 12 | 164 | 56 | 3.94 | 19.6 |

*Sulfur dioxide Oxidation and Absorption Index is defined as the percentage of magnesium in a given composition that is involved in picking-up sulfur trioxide which is produced by the oxidation of sulfur dioxide in the presence of the given composition in 15 minutes at a standard temperature. The gas flowrate is 160 ml.–170 ml. per minute and the gas included 0.32 mole % of sulfur dioxide, and 2.0 mole % of oxygen, with the balance being nitrogen. SOAI is a measure of the ability of a given composition to associate with sulfur oxides, e.g., in the catalyst regeneration zone of a catalytic cracking unit. The higher the SOAI, the better the sulfur oxide association ability of the composition.

The spinel compositions (Examples 3 through 6 and 8 through 11) have both high surface areas and good attrition resistance, i.e., low ARI. This is compared with a spinel composition prepared by an alternative process, (Example 12) which has a high surface area but a relatively poor attrition resistance.

The SOAI's of the spinel compositions 4, 5, 6, 8, 9, 10 and 11 indicate that each of these compositions are useful as sulfur oxide removal agents, e.g., in catalytic cracking units.

EXAMPLES 13 TO 19

Compositions identical to the final compositions from each of Examples 4, 5, 6, 8, 9, 10 and 11 are included as separate particles with a conventional, crystalline aluminosilicate-containing fluid catalytic cracking catalyst so that the total composition/catalyst system contain about 1% by weight of the composition. Each of these systems is used in a commercial fluid catalytic cracking unit to promote the cracking of a gas oil feedstock including about 0.7% by weight of sulfur. After a period of time, each of the systems is effective to promote the desired hydrocarbon cracking, and to reduce the amount of sulfur oxide and nitrogen oxide emitted from the catalyst regeneration zone of the unit, relative to the amount of sulfur oxide and nitrogen oxide emitted with none of the above noted compositions present.

cent and 25 weight percent silica as versus pure spinel is presented in Table 3.

TABLE 2

| Example No. | Clay (% by Wt.) | Spinel Ingredient (% by Wt.) | APS (Microns) | Surface Area M²/g | Attrition Index KS | KT | SOAI | SOAI* |
|---|---|---|---|---|---|---|---|---|
| 20 | 10 | 90 | 55 | 117 | 1.0 | 5.6 | 17.0 | 19.0 |
| 21 | 25 | 75 | 56 | 125 | 0.5 | 3.0 | 16.0 | 21.3 |
| 22 | 50 | 50 | 68 | 87 | 1.0 | 5.6 | 13.8 | 27.6 |
| 23 | 75 | 25 | 66 | 61 | 2.5 | 12.5 | 11.1 | 44.4 |

SOAI* = SOAI adjusted for clay.

EXAMPLES 20 TO 23

In order to illustrate the advantages to be achieved by utilizing a quantity of kaolin clay in admixture with the spinel forming ingredients to produce a co-gel, in accordance with the present invention several compositions, having varying amounts of clay were prepared using the following components:

Pseudo Boehmite Alumina (Condea Chemie), High reactivity MgO (C. E. Basic Chemicals), Cerium Nitrate solution (Molycorp), Vanadium Pentoxide (Umetco Minerals Corp.), Oxalic acid dihydrate (Alfa products), and RC-32 clay (Thiele Kaolin Corp.) were used as received. Preparation of $H_2VO(C_2O_4)_2$ solution and $SO_2$ Oxidation and Absorption Indices (SOAI) calculations were described earlier.

All of the preparations required the co-geling of water, TSPP (tetrasodium pyrophosphate), alumina, MgO, formic acid, 60% $Ce(NO_3)_3$ solution, $H_2VO(C_2O_4)_2$ solution, and 61% clay slurry. The relative amount of each component was varied according to the desired end formulation. A typical preparation of the material containing 50% spinel ingredients and 50% clay is decribed below.

A 2 kg batch of dry solid was prepared by spray drying a slurry containing 7.5 kg water, 350 g formic acid, 648 g (74% solids) Condea SB alumina, 416 g (93% solid) MgO in 1.5 kg water, 443 g 60% Ce($NO_3$)$_3$.6$H_2O$, a $H_2VO(C_2O_4)_2$ solution containing 18 g of $V_2O_5$, 62 g of oxalic acid dihydrate in 200 mL water, and 1640 g RC-32 clay (61% slurry). The spray dried microspheres were calcined at 1325° F. for 3 hr to obtain the final product.

The results reflected in Table 2 clearly demonstrate that any amount of inexpensive kaolin clay can be added to the co-gel to produce catalystic agents of varying activities. The clay serves to dilute the amount of the spinel material however the activity of the final product is not necessarily proportionally related to the amount of spinel agent present in the material. This indicates that there is no major chemical or surface reaction occurring between the spinel components and the clay material.

EXAMPLES 24 TO 28

In order to illustrate the improvement provided to the physical characteristics of the final spinel/clay compositions provided by the present invention, a number of tests were taken to evaluate various compositions prepared in accordance with the procedures outlined in Examples 19 to 23. Spinel/clay compositions were compared with a pure spinel composition and with spinel/silica compositions. The data for the evaluation of a spinel/clay compositions having 10 weight percent clay and 25 weight percent clay, respectively, as compared with spinel/silica compositions having 10 weight per-

TABLE 3

| Ex. No. | Composition | Clay/Silica Wt. % | KS | KT | SOAI | SOAI* |
|---|---|---|---|---|---|---|
| 24 | Spinel | 0 | 0.9 | 5.0 | 19 | 19 |
| 25 | Spinel/Clay | 10 | 1.0 | 5.6 | 17 | 19 |
| 26 | Spinel/Clay | 25 | 0.5 | 3.0 | 16 | 21.3 |
| 27 | Spinel/Silica | 10 | 1.6 | 8.9 | 16.8 | 18.6 |
| 28 | Spinel/Silica | 25 | 1.4 | 10.9 | — | — |

SOAI* = SOAI adjusted for clay.

These results clearly show that where the addition of silica renders the composition much softer than pure spinel, the addition of similar amounts of kaolin clay substantially improved the hardness of the product. The present invention provides improved spinel/clay compositions, spinel/clay composition preparation processes and processes for using such spinel/clays. The spinel/clay compositions of the present invention have both high surface area and increased attrition resistance, making them especially attractive as sulfur oxide and/or nitrogen oxide control agents, e.g., with the circulating catalyst in catalytic cracking units. The present spinel/clay composition preparation process is relatively easy to practice and control, and provides outstanding products. In addition, by properly choosing the feed materials, the present preparation process may be practiced with reduced or no sulfur oxide and/or nitrogen oxide emissions.

While the invention has been described with respect to various specific examples and embodiments, it is to be understood that the invention is not limited thereto and that it can be variously practiced within the scope of the following claims.

I claim:

1. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process comprising:
   (a) combining (1) an acidic, aluminum-containing composition in which the aluminum is present in a positively charged species, and (2) a basic alkaline earth metal-containing composition to form a gel mixture; and
   (b) mixing the gel with kaolin clay to form a co-gel mixture; and
   (c) calcining said co-gel mixture to form said alkaline earth metal, aluminum-containing spinel composition, in a kaolin clay matrix.

2. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising untilizing as at least a portion of said material the spinel/clay composition produced in accordance with the process of claim 1 wherein the alkaline earth metal is magnesium.

3. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 1 wherein the said alkaline earth metal is magnesium, the said aluminum in the said acidic composition is present as at least partially peptized alumina and the said acidic composition optionally includes at least one acid selected from the group consisting of formic acid, mono-basic mineral acids and mixtures thereof.

4. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 1 wherein the said rare earth metal is magnesium which may optionally contain free magnesia.

5. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 1 wherein at least one of said acidic and basic compositions or a separate additional composition which is combined with said first and second compositions in step (a) includes at least one additional metal compound in an amount sufficient so that said spinel/clay composition includes at least one additional metal component in an amount effective to promote the oxidation of sulfur dioxide to sulfur trioxide at sulfur dioxide oxidation conditions.

6. In a process for reducing at least one of (1) the sulfur oxide content if a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 1 wherein at least one of said acidic and basic compositions or a separate additional composition which is combined with said acidic and basic compositions in step (a) includes at least one reductive metal compound in an amount sufficient so that said spinel/clay composition includes at least one reductive metal component in an amount effective to promote the reduction of said alkaline earth metal sulfate at said alkaline earth metal sulfate reduction conditions.

7. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion said material the spinel/clay composition produced in accordance with the process of claim 1 wherein at least one of said acidic and basic compositions or a separate additional composition which is combined with said acidic and basic compositions in step (a) includes at least one reductive metal compound in an amount sufficient so that said spinel/clay composition includes at least one reductive metal component in an amount effective to promote the reduction of said magnesium sulfate at said magnesium sulfate reduction conditions.

8. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 5 wherein the said additional metal compound is a cerium compound, and at least one of said acidic and basic compositions or a separate additional composition which is combined with said acidic and basic compositions in step (a) includes at least one reductive metal compound in an amount sufficient so that said spinel/clay composition includes at least one reductive metal component in an amount effective to promote the reduction of said magnesium sulfate at said magnesium sulfate reduction conditions wherein said reductive metal compound is optionally vanadium which may be present as a water soluble vanadium compound or in the form of a vanadium complex, together with one complexing agent which is present in an amount effective to reduce vanadium to the plus 4 oxidation state and which complexing agent is selected from the group consisting of dicarboxylic acids having from 2 to about 12 carbon atoms and mixtures thereof.

9. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 1 wherein the alkaline earth metal, aluminum spinel/clay composition comprises a spinel having a surface area greater than about 40 $m_2$/gm and an attrition resistance index less than about 3.0.

10. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing at least a portion of said material the spinel/clay composition produced in accordance with the process of claim 9 wherein said spinel/clay has a surface area greater than about 60 $m_2$/gm and an attrition resistance index less than about 1.0 and which further comprises at least one additional metal component in association with said spinel/clay, said additional metal component being present in an amount effective to promote the oxidation of sulfur dioxide to sulfur trioxide at sulfur dioxide conditions.

11. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 9 wherein said alkaline earth metal is magnesium and which composition further comprises at least one reductive metal component in association with said spinel/clay said reductive metal component being present at an amount effective to promote the reduction of magnesium sulfate at mangesium sulfate conditons.

12. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 9 wherein said alkaline earth metal is magnesium and which further comprises at least one additional metal component in association with said spinel/clay, said additional metal component being present in an amount effective to promote the oxidation of sulfur dioxide to sulfur trioxide at sulfur dioxide oxidation conditions, and which further comprises at least one reductive metal component in association with said spinel/clay, said reductive metal component being present in an amount effective to promote the reduction of magnesium sulfate and magnesium sulfate conditions.

13. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process of claim 12 which further comprises about 0.1% to about 30% by weight of free magnesia associated with said spinel/clay excluding the weight of clay.

14. In a process for reducing at least one of (1) the sulfur oxide content of a sulfur oxide-containing gas and (2) the nitrogen oxide content of a nitrogen oxide-containing gas which includes contacting said gas with a material at conditions to reduce at least one of (1) the sulfur oxide content of said gas and (2) the nitrogen oxide content of said gas, the improvement comprising utilizing as at least a portion of said material the spinel/clay composition produced in accordance with the process comprising:
   (a) combining (1) an acidic, aluminum-containing composition in which the aluminum is present in a positively charged species; (2) a basic, alkaline earth metal-containing composition to form a co-gel mixture;
   (b) optionally, mixing the co-gel mixture with additional kaolin clay; and
   (c) calcining said co-gel mixture to form said alkaline earth metal, aluminum-containing spinel composition in a kaolin clay matrix.

* * * * *